(12) United States Patent
Bigard

(10) Patent No.: US 7,163,082 B2
(45) Date of Patent: Jan. 16, 2007

(54) CLIMBING STICK APPARATUS

(76) Inventor: John H. Bigard, 197 S. Bamber Rd., Mount Pleasant, MI (US) 48858

( * ) Notice: Subject to any disclaimer, the term of this patent is extended or adjusted under 35 U.S.C. 154(b) by 308 days.

(21) Appl. No.: 10/827,867

(22) Filed: Apr. 20, 2004

(65) Prior Publication Data
US 2005/0230186 A1 Oct. 20, 2005

(51) Int. Cl.
E06C 9/00 (2006.01)
A62B 1/20 (2006.01)

(52) U.S. Cl. .................. 182/100; 182/189; 182/93; 182/214

(58) Field of Classification Search .............. 182/100, 182/189, 93, 187, 135, 116, 20, 214, 107
See application file for complete search history.

(56) References Cited

U.S. PATENT DOCUMENTS 2,744,674 A * 5/1956 Smith .................... 182/189
3,485,322 A * 12/1969 Trefz .................... 182/189
3,995,714 A * 12/1976 Brookes et al. ............ 182/100
4,592,446 A * 6/1986 White .................... 182/93
4,598,906 A * 7/1986 Sansbury ................ 182/189
4,762,200 A 8/1988 Andrews et al.
5,040,635 A 8/1991 Strickland
5,454,445 A * 10/1995 Berryman ................ 182/100
5,655,623 A 8/1997 Skyba
6,305,497 B1 10/2001 Simon
6,340,071 B1 * 1/2002 Diekemper .............. 182/100
6,668,975 B1 * 12/2003 Skipper .................. 182/100

* cited by examiner

Primary Examiner—Hugh B. Thompson, II

(57) ABSTRACT

A climbing stick apparatus includes a plurality of stick members, each of which includes a fastener reception portion at each stick member end and a plurality of foot-support-reception channels. A plurality of member-to-member couplers and fasteners are provided for erecting a plurality of stick members in a longitudinal arrangement. A plurality of foot support members are received in the foot-support-reception channels. The climbing stick apparatus of the invention permits rapid assembly of a climbing stick next to a tree for hunters and other outdoorsmen. When erected next to a tree the climbing stick apparatus permits the hunter to remain above ground level so that he is not noticed or smelled by game on the ft floor.

11 Claims, 3 Drawing Sheets

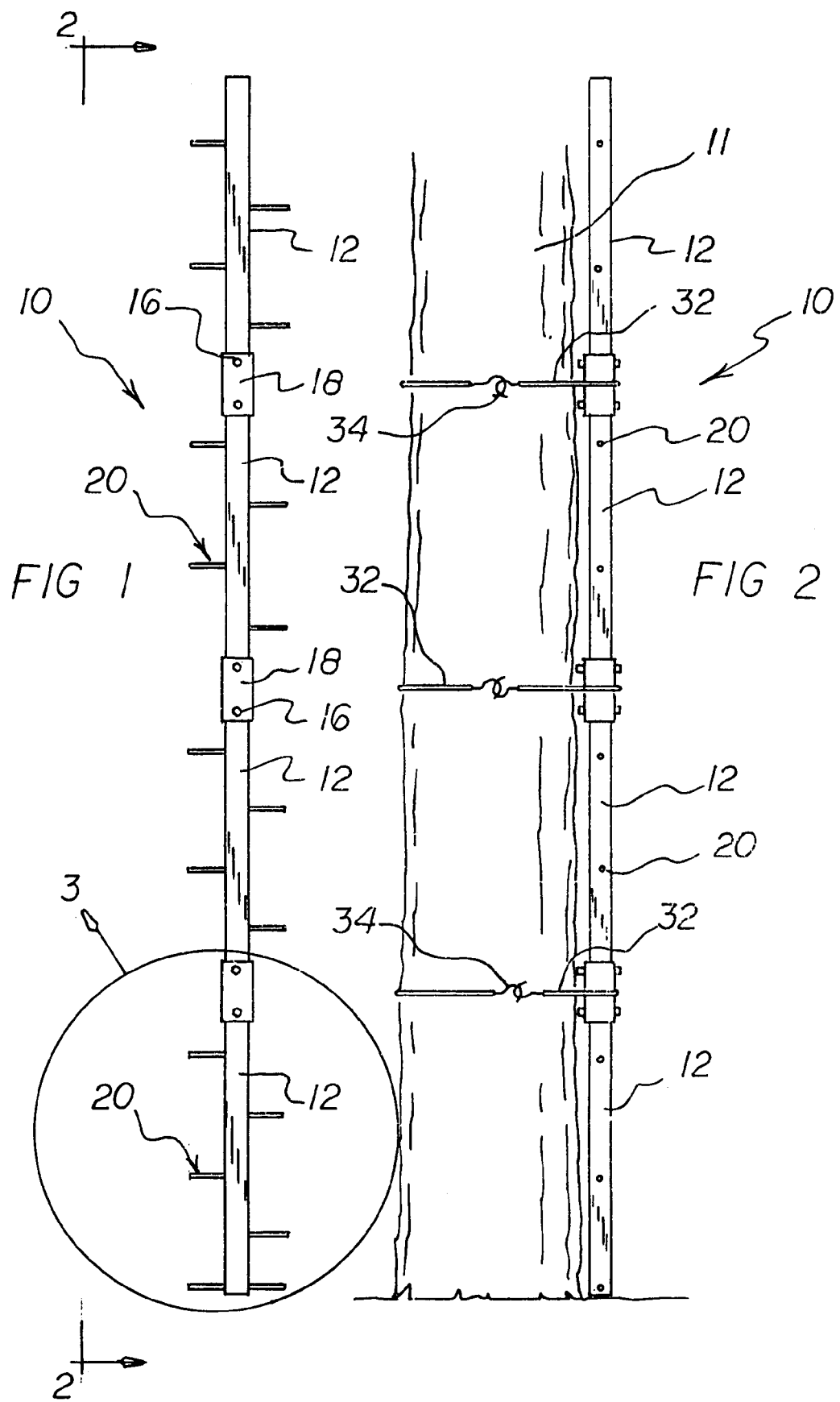

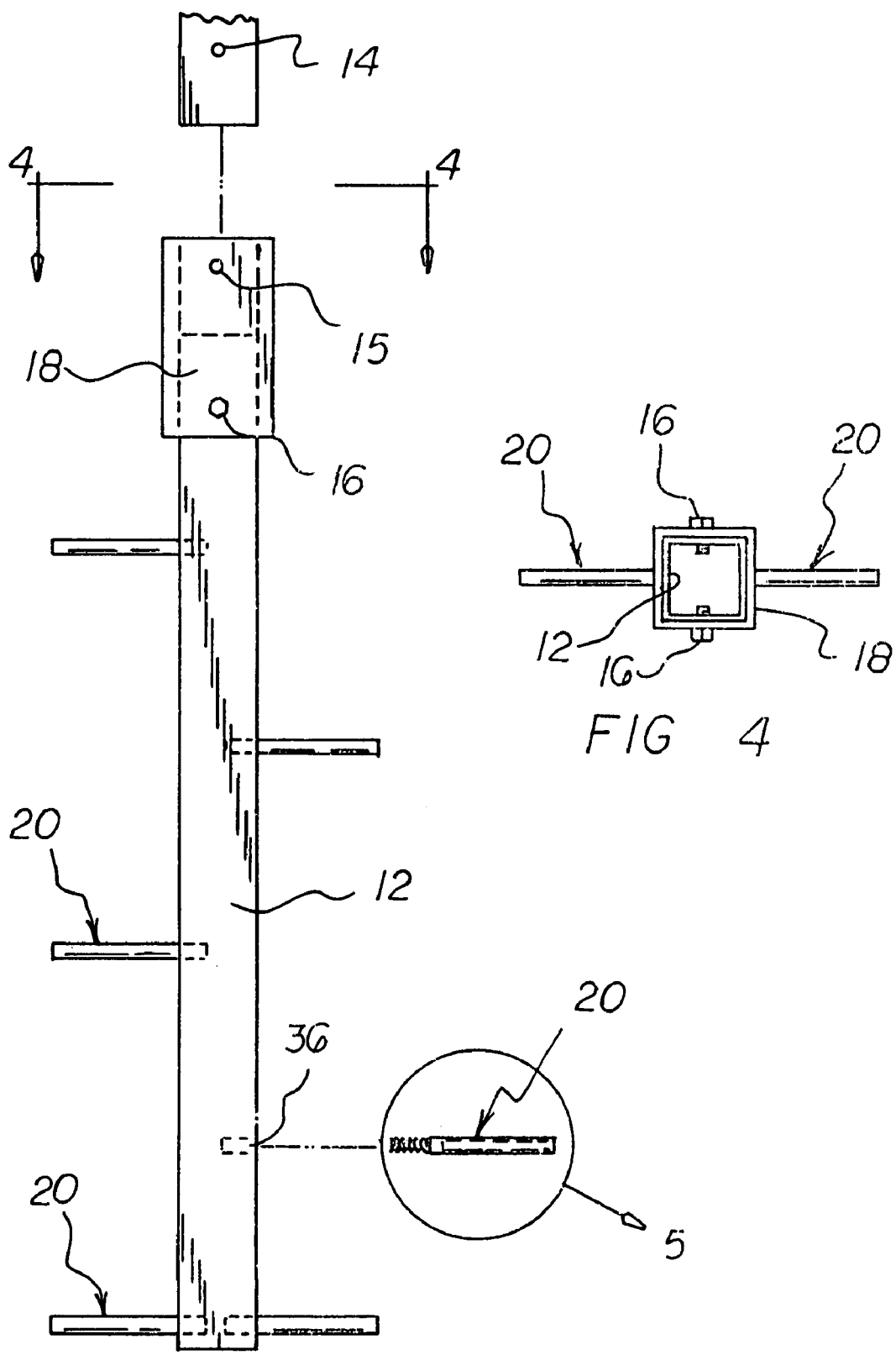

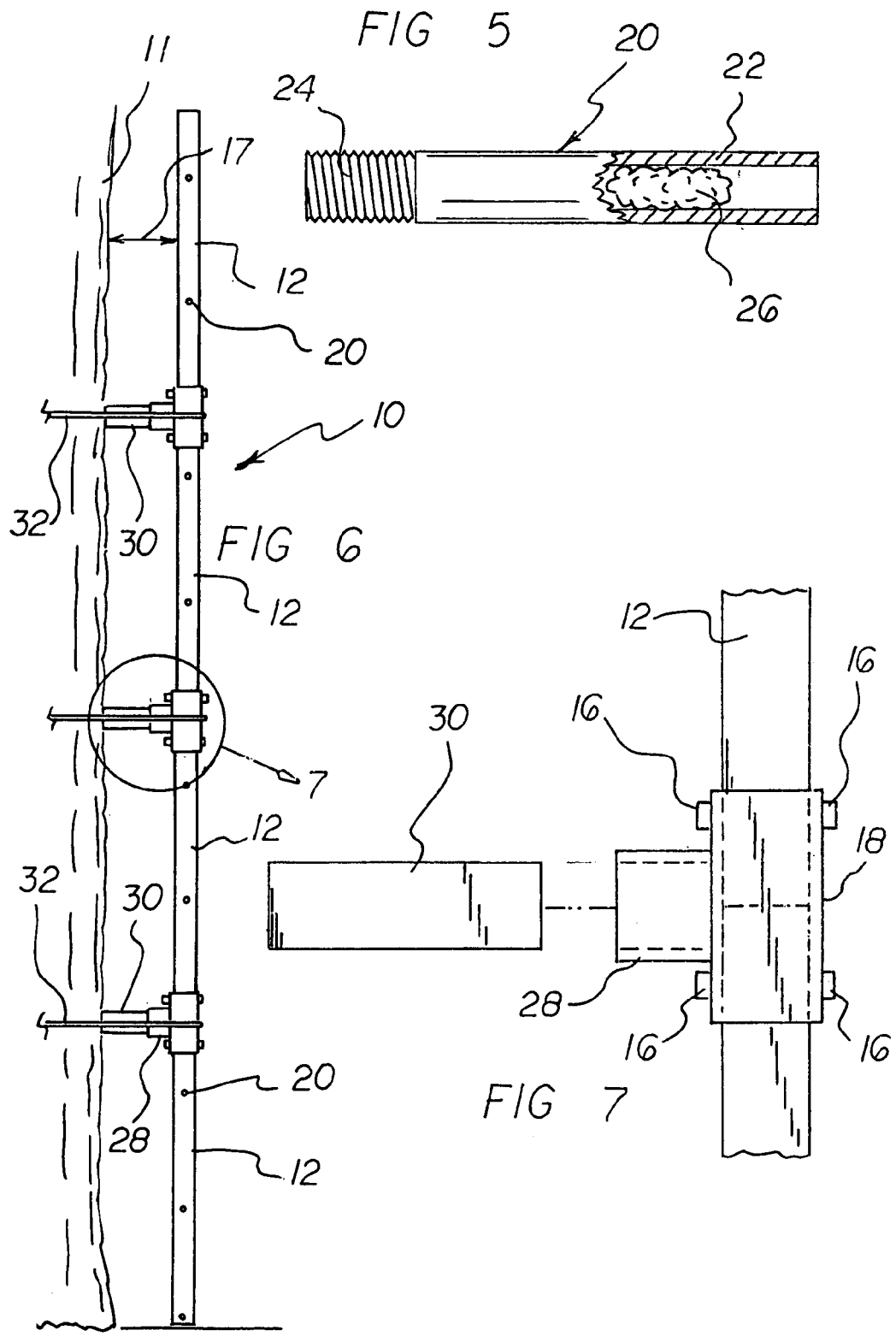

CLIMBING STICK APPARATUS

BACKGROUND OF THE INVENTION

1. Field of the Invention

The present invention relates generally to ladders and, more particularly, to ladders especially adapted for climbing trees.

2. Description of the Prior Art

Ladders used for climbing trees are well known in the art. Such ladders are especially useful for hunters who wish to climb trees, such as for gaining access to a tree-mounted hunting stand.

In this respect, throughout the years, a number of innovations have been developed relating to tree ladders, and the following U.S. patents are representative of some of those innovations: U.S. Pat. Nos. 4,762,200, 5,040,635, 5,655,623, 6,305,497, and 6,340,071. More specifically, U.S. Pat. No. 4,762,200 discloses a tree ladder which includes only two, relatively long ladder sections that are carried to a tree and are assembled at a tree to be climbed. Once the tree ladder is assembled, the top of the tree ladder hooks over a branch of the tree to stabilize to the tree ladder to the tree. Rather than having two relatively long tree ladder sections, for convenience in carrying and storing the tree ladder when not in use, it would be desirable if a tree ladder were provided which included a plurality of relatively short tree ladder sections which are assembled to form a full length tree ladder. Also, since heights of branches on a tree truck may not be coincident with the height of the top section of a tree ladder, rather than hooking the top portion of the tree ladder over a branch, it would be desirable if stabilization of the tree ladder did not depend upon hooking over a branch for stabilizing the tree ladder on the tree.

U.S. Pat. No. 5,040,635 discloses a pole ladder comprised of two relatively long pole sections. As explained above, it would be desirable if a tree ladder included a plurality of relatively short tree ladder sections which are assembled to form a full length tree ladder.

U.S. Pat. No. 5,655,623 discloses a folding tree ladder and tree stand. Elongated riser components are connected together with a folding joint. In this respect, the overall height of the tree ladder is pre-defined. Since tree heights are of various heights, and since a hunter would like to decide for oneself as to the height of a tree ladder that is to be used, it would be desirable to have a tree ladder whose height can be selected by the user of the tree ladder.

U.S. Pat. No. 6,305,497 discloses a mast ladder for a sailboat mast. This mast ladder employs a sail slide for its operation. Obviously, a tree does not have a sail slide, and, in this respect, this patent is not relevant with respect to a tree stand, used by hunters.

U.S. Pat. No. 6,340,071 discloses a rung-foldable ladder device which includes a single elongate tubular support member and a plurality of rung members which are tethered together. The single elongate tubular support member is not convenient for storage and transport by a hunter, such as through a wooded area. Moreover, by tethering the rungs together, the tethers can become twisted and knotted, whereby placement of the rungs on the tubular support member may be impeded. In this respect, it would be desirable if a tree ladder is provided in which rungs of the ladder are not tethered together.

Still other features would be desirable in a tree ladder which may also be called a climbing stick apparatus. For example, when the climbing stick apparatus is not in use, such as when it is disassembled and carried by a hunter, it would be desirable if the disassembled climbing stick apparatus can be in a kit form.

Also, there may be times when it would be desirable for a climbing stick apparatus not to be in direct contact with the trunk of a tree. In this respect, it would be desirable if a climbing stick apparatus were provided which can be spaced from a tree trunk.

Thus, while the foregoing body of prior art indicates it to be well known to use climbing sticks or tree ladders, the prior art described above does not teach or suggest a climbing stick apparatus which has the following combination of desirable features: (1) includes a plurality of relatively short tree ladder sections which are assembled to form a full length tree ladder; (2) does not depend upon hooking over a branch for stabilizing the tree ladder on the tree; (3) has an adjustable height which can be adjusted by the user of the tree ladder; (4) includes ladder rungs which are not tethered together; (5) can be provided in a kit form; and (6) can be spaced from a tree trunk when installed on a tree. The foregoing desired characteristics are provided by the unique climbing stick apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a climbing stick apparatus which includes a plurality of stick members, wherein each stick member includes a fastener reception portion at each stick member end, and wherein each stick member includes a plurality of foot-support-reception channels. A plurality of member-to-member couplers are provided, wherein each member-to-member coupler includes a fastener reception portion at each end of the member-to-member coupler. A plurality of fasteners are provided for securing a selected member-to-member coupler to a pair of selected stick members. A plurality of foot support members are provided for being received in the foot-support-reception channels. The climbing stick apparatus of the invention permits rapid assembly of a climbing stick next to a tree for hunters and other outdoorsmen. When erected next to a tree the climbing stick apparatus of the invention permits the hunter to remain above ground level so that he is not noticed or smelled by game on the ft floor.

Each of the foot support members includes a foot reception portion and a stick-member-connector portion. Preferably, the stick members have a square cross-section.

Preferably, the stick members include internally threaded fastener reception portions; the member-to-member couplers include internally threaded fastener reception portions; and each of the fasteners includes an externally threaded portion which screws into an internally threaded fastener reception portion and an internally threaded fastener reception portion which are placed in registration with other.

Preferably, the foot-support-reception channels are internally threaded, and each of the foot support members includes an externally threaded stick-member-connector portion which is screwed into a respective foot-support-reception channel.

The stick members can be either solid throughout or hollow. Preferably, the stick members can are hollow, thereby providing both strength and light weight. Similarly, the foot support members can be either solid throughout or hollow. When the foot support members are hollow, a wad of scent bearing material can be inserted into a hollow foot support member.

A plurality of tree-to-stick binding members can be provided for binding an erected climbing stick apparatus to a tree. Each of the tree-to-stick binding members can include a pair of binding hooks for easily securing the ends of the tree-to-stick binding members together when they are placed circumferentially around the tree and a member-to-member coupler.

In accordance with another aspect of the invention, a spacer member reception extension is connected to each of the respective member-to-member couplers, and a spacer member received in each of the spacer member reception extensions.

The climbing stick apparatus of the invention can be provided as a disassembled kit which can be stored in a disassembled state and which can be erected on site, next to a tree.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved climbing stick apparatus which has all of the advantages of the prior art and none of the disadvantages.

It is another object of the present invention to provide a new and improved climbing stick apparatus which may be easily and efficiently manufactured and marketed.

It is a further object of the present invention to provide a new and improved climbing stick apparatus which is of durable and reliable construction.

An even further object of the present invention is to provide a new and improved climbing stick apparatus which is susceptible of a low cost of manufacture with regard to both materials and labor, and which accordingly is then susceptible of low prices of sale to the consuming public, thereby making such climbing stick apparatus available to the buying public.

Still yet a further object of the present invention is to provide a new and improved climbing stick apparatus which includes a plurality of relatively short tree ladder sections which are assembled to form a full length tree ladder.

Still another object of the present invention is to provide a new and improved climbing stick apparatus that does not depend upon hooking over a branch for stabilizing the tree ladder on the tree.

Yet another object of the present invention is to provide a new and improved climbing stick apparatus which has an adjustable height which can be adjusted by the user of the tree ladder.

Even another object of the present invention is to provide a new and improved climbing stick apparatus that includes ladder rungs which are not tethered together.

Still a further object of the present invention is to provide a new and improved climbing stick apparatus which can be provided in a kit form.

Yet another object of the present invention is to provide a new and improved climbing stick apparatus that can be spaced from a tree trunk when installed on a tree.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a front view showing a fully assembled first embodiment of the climbing stick apparatus of the invention.

FIG. 2 is a side view of the embodiment of the climbing stick apparatus shown in FIG. 1 fastened to a tree and taken along line 2—2 of FIG. 1.

FIG. 3 is a partially exploded enlarged front view of the portion of the embodiment of the invention shown in FIG. 1 that is contained in circled region 3 of FIG. 1.

FIG. 4 is a top view of the embodiment of the embodiment of the invention shown in FIG. 3 taken along line 4—4 thereof.

FIG. 5 is a front view of a foot support member, contained in circled region 5 of FIG. 3.

FIG. 6 is a second embodiment of the invention which also includes brace members positioned between the tree and the remainder of the climbing stick apparatus of the invention.

FIG. 7 is an enlarged exploded view of the portion of the embodiment of the invention shown in circled region 7 of FIG. 6.

DESCRIPTION OF THE PREFERRED EMBODIMENT

With reference to the drawings, a new and improved climbing stick apparatus embodying the principles and concepts of the present invention will be described.

Turning to FIGS. 1–5, a first embodiment of the climbing stick apparatus of the invention is shown generally designated by reference numeral 10. In the first embodiment, climbing stick apparatus 10 includes a plurality of stick members 12, wherein each stick member 12 includes a fastener reception portion 14 at each stick member end, and wherein each stick member 12 includes a plurality of foot-support-reception channels 36. A plurality of member-to-member couplers 18 are provided, wherein each member-to-member coupler 18 includes a fastener reception portion 15 at each end of the member-to-member coupler 18. A plurality of fasteners 16 are provided for securing a selected member-to-member coupler 18 to a pair of selected stick members 12. A plurality of foot support members 20 are provided for being received in the foot-support-reception channels 36.

Each of the foot support members 20 includes a foot reception portion 22 and a stick-member-connector portion 24. Preferably, the stick members 12 have a square cross-section.

Preferably, the stick members 12 include internally threaded fastener reception portions 14; the member-to-member couplers 18 include internally threaded fastener reception portions 15; and each of the fasteners 16 includes an externally threaded portion which screws into an internally threaded fastener reception portion 14 and an internally threaded fastener reception portion 15 which are placed in registration with other.

Preferably, the foot-support-reception channels 36 are internally threaded, and each of the foot support members 20 includes an externally threaded stick-member-connector portion 24 which is screwed into a respective foot-support-reception channel 36.

The stick members 12 can be either solid throughout or hollow. Preferably, the stick members 12 can are hollow, thereby providing both strength and light weight. Similarly, the foot support members 20 can be either solid throughout or hollow. When the foot support members 20 are hollow, a wad of scent bearing material 26 can be inserted into a hollow foot support member 20 as shown in FIG. 5.

A plurality of tree-to-stick binding members 32 can be provided for binding an erected climbing stick apparatus to a tree 11. Each of the tree-to-stick binding members 32 can include a pair of binding hooks 34 for easily securing the ends of the tree-to-stick binding members 32 together when they are placed circumferentially around the tree 11 and a member-to-member coupler 18.

Turning to FIGS. 6 and 7, a second embodiment of the invention is shown. Reference numerals are shown that correspond to like reference numerals that designate like elements shown in the other figures. In addition, a spacer member reception extension 28 is connected to each of the respective member-to-member couplers 18, and a spacer member 30 received in each of the spacer member reception extensions 28. The spacer members 30 serve to provide a rigidly defined spacing 17 between the tree 11 and the stick members 12 of the climbing stick apparatus 10 of the invention.

To use a climbing stick apparatus 10 of the invention, a first stick member 12 is obtained and placed in a vertical orientation next to a tree 11. Then, the bottom fastener reception portions 15 of a first member-to-member coupler 18 are placed in registration with the top fastener reception portions 14 of the first stick member 12. Then, fasteners 16 are screwed into the registered fastener reception portions 14 and the fastener reception portions 15 to secure the first member-to-member coupler 18 to the first stick member 12.

Then, a second stick member 12 is slid into the top portion of the first member-to-member coupler 18 so that the bottom end of the second stick member 12 substantially rests on the top end of the first stick member 12. The bottom fastener reception portions 14 of the second stick member 12 are placed in registration with the top fastener reception portions 15 of the first member-to-member coupler 18, and fasteners 16 are screwed into the respective registered fastener reception portions to secure the second stick member 12 to the first member-to-member coupler 18 and the first stick member 12.

This procedure is repeated to extend the climbing stick apparatus 10 with a third, fourth, fifth, etc. stick member 12 and a second, third, fourth, etc. member-to-member coupler 18 to make the longitudinal length of the climbing stick apparatus 10 as long (or as short) as desired.

The foot support members 20 are attached to the stick members 12 by screwing the externally threaded stick-member-connector portions 24 into the internally threaded foot-support-reception channels 36 in the stick members 12.

As shown in FIGS. 1 and 3, the foot support members 20 are located on the stick members 12 in alternating right/left positions, such as is commonly employed with foot support members 20 on telephone poles.

To secure the climbing stick apparatus 10 to a tree 11, as shown in drawing FIGS. 2 and 6, tree-to-stick binding members 32 are placed to encompass portions of the tree 11 and the member-to-member couplers 18. Free ends of the tree-to-stick binding members 32 can includes binding hooks 34 for securing the free ends of the tree-to-stick binding members 32 together.

The tree-to-stick binding members 32 can be made from elastic material, such as well know bungee cord materials.

The climbing stick apparatus 10 of the invention can be provided as a disassembled kit which can be stored in a disassembled state and which can be erected on site, next to a tree 11, as described above. After the erected climbing stick apparatus 10 is no longer needed, it can be disassembled back into its kit form for convenient storage. The kit form can be carried is a carry bag (not shown).

The respective longitudinal lengths of the stick members 12 can be any suitable lengths, and the respective longitudinal lengths of the member-to-member couplers 18 can be any suitable lengths. Similarly, the respective widths and heights of the stick members 12 and the member-to-member couplers 18 can be any suitable respective dimensions. It is understood, however, that the member-to-member couplers 18 preferably fit telescopically on the outside ends of the stick members 12, as shown in the drawing Figures.

The components of the climbing stick apparatus of the invention can be made from inexpensive and durable metal and plastic materials.

The components of the climbing stick apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved climbing stick apparatus that is low in cost, relatively simple in design and operation, and which may advantageously be used to provide a plurality of relatively short tree ladder sections which are assembled to form a full length tree ladder. With the invention, a climbing stick apparatus is provided which does not depend upon hooking over a branch for stabilizing the tree ladder on the tree. With the invention, a climbing stick apparatus is provided which has an adjustable height which can be adjusted by the user of the tree ladder. With the invention, a climbing stick apparatus is provided which includes ladder rungs which are not tethered together. With the invention, a climbing stick apparatus is provided which can be provided in a kit form.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A climbing stick apparatus, comprising:
   a plurality of stick members, wherein each stick member includes a fastener reception portion at each stick member end, and wherein each stick member includes a plurality of foot-support-reception channels,
   a plurality of member-to-member couplers, wherein each member-to-member coupler includes a fastener reception portion at each end of said member-to-member coupler,
   a plurality of fasteners for securing a selected member-to-member coupler to a pair of selected stick members, and
   a plurality of foot support members for reception in said foot-support-reception channels,
   and wherein:
   said stick members include internally threaded fastener reception portions,
   said member-to-member couplers include internally threaded fastener reception portion, and
   each of said fasteners includes an externally threaded portion which screws into an internally threaded fastener reception portion and an internally threaded fastener reception portion which are placed in registration with other.

2. The apparatus of claim 1 wherein each of said foot support members includes a foot reception portion and a stick-member-connector portion.

3. The apparatus of claim 1 wherein said stick members have a square cross-section.

4. The apparatus of claim 1 wherein said stick members are hollow.

5. The apparatus of claim 1, further including:
   a plurality of tree-to-stick binding members for binding an erected climbing stick apparatus to a tree.

6. The apparatus of claim 5 wherein each of said tree-to-stick binding members includes a pair of binding hooks.

7. A climbing stick apparatus, comprising:
   a plurality of stick members, wherein each stick member includes a fastener reception portion at each stick member end, and wherein each stick member includes a plurality of foot-support-reception channels,
   a plurality of member-to-member couplers, wherein each member-to-member coupler includes a fastener reception portion at each end of said member-to-member coupler,
   a plurality of fasteners for securing a selected member-to-member coupler to a pair of selected stick members, and
   a plurality of foot support members for reception in said foot-support-reception channels, and
   wherein said foot support members are hollow.

8. The apparatus of claim 7, further including:
   a wad of scent bearing material inserted into a hollow foot support member.

9. A climbing stick apparatus, comprising:
   a plurality of stick members, wherein each stick member includes a fastener reception portion at each stick member end, and wherein each stick member includes a plurality of foot-support-reception channels.
   a plurality of member-to-member couplers, wherein each member-to-member coupler includes a fastener reception portion at each end of said member-to-member coupler,
   a plurality of fasteners for securing a selected member-to-member coupler to a pair of selected stick members, and
   a plurality of foot support members for reception in said foot-support-reception channels, and wherein:
   said foot-support-reception channels are internally threaded, and
   each of said foot support members includes an externally threaded stick-member-connector portion which is screwed into a respective foot-support-reception channel.

10. A climbing stick apparatus, comprising:
    a plurality of stick members, wherein each stick member includes a fastener reception portion at each stick member end, and wherein each stick member includes a plurality of foot-support-reception channels,
    a plurality of member-to-member couplers, wherein each member-to-member coupler includes a fastener reception portion at each end of said member-to-member coupler,
    a plurality of fasteners for securing a selected member-to-member coupler to a pair of selected stick members, and
    a plurality of foot support members for reception in said foot-support-reception channels, and further including:
    a spacer member reception extension connected to each of said respective member-to-member couplers, and
    a spacer member received in each of said spacer member reception extensions.

11. The apparatus of claim 10 which is provided as a disassembled kit which can be stored in a disassembled state and which can be erected on site, next to a tree.

* * * * *